Patented May 19, 1942

2,283,220

UNITED STATES PATENT OFFICE 2,283,220

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application June 2, 1939, Serial No. 277,084

9 Claims. (Cl. 260—155)

This invention relates to azo compounds having a quinoline nucleus and to the application of this class of dyestuffs to the coloration of organic derivatives of cellulose, wool and silk. More particularly it relates to azo compounds having the general formula:

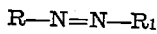

wherein R represents a quinoline nucleus attached to the azo group in position 5 or 8, and $R_1$ represents a member selected from the group consisting of a benzene nucleus, an azobenzene nucleus, a naphthalene nucleus, and a heterocyclic nucleus.

It is an object therefore of our invention to prepare the class of azo compounds above described and to color cellulose organic derivatives, wool and silk, but particularly cellulose acetate in the form of threads, yarns, filaments and fabric materials therewith.

The method of obtaining the azo compounds of our invention comprises forming the diazo salts of 5-amino quinoline and 8-amino quinoline, as well as the diazo salts of various substitution products of these compounds, and coupling them with suitable coupling components belonging to the benzene and naphthalene series, and with heterocyclic coupling components such as barbituric acid, pyrazolone, and similar type of heterocyclic compounds capable of being coupled.

The following examples illustrate the preparation of the azo compounds of the invention.

Example 1

17.4 grams of 7-methoxy-8-aminoquinoline are dissolved in 200 c. cs. of water containing 35 c. cs. of hydrochloric acid, ice is added, and the amine is diazotized with 6.9 grams of sodium nitrite. 12.8 grams of barbituric acid are dissolved in aqueous sodium carbonate, ice is added, and the diazo solution prepared as above is added slowly. When the coupling reaction is complete, the mixture is made acid to litmus with acetic acid, and the dye is then filtered off, washed and dried. Cellulose acetate is colored yellow from aqueous suspensions of the dye.

The azo compound obtained as above has the formula:

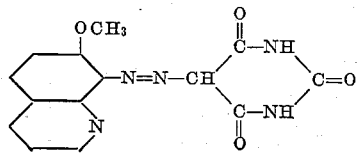

Example 2

22.0 grams of 7-nitro-5-chloro-8-aminoquinoline are placed in 200 c. cs. of water containing 50 c. cs. of hydrochloric acid and diazotized with 6.0 grams of sodium nitrite at 5–15° C. The diazo solution is then coupled with an equivalent amount of dimethyl dihydroresorcinol in the manner described in Example 1. Cellulose acetate is colored yellow from aqueous suspensions of the dye.

The azo compound thus obtained has the formula:

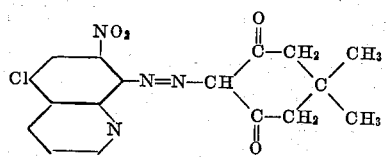

In place of dimethyl dihydro resorcinol there may be substituted monomethyl dihydroresorcinol.

Example 3

18.9 grams of 5-amino-8-nitroquinoline are added to 200 c. cs. of water containing 50 c. cs. of hydrochloric acid and diazotized with 6.9 grams of sodium nitrite at 5–15° C. The diazo solution is then added to 15.0 grams of β-hydroxyethyl-m-toluidine dissolved in cold dilute hydrochloric acid, and sodium acetate is added until the mixture is no longer acid to Congo red indicator. When the coupling reaction is complete, the dye is filtered off, washed and dried. Cellulose acetate is colored rubine shades from aqueous suspensions of the dye.

The azo compound thus obtained has the formula:

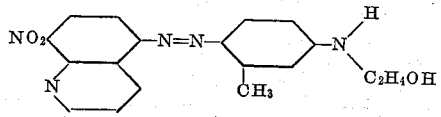

In place of β-hydroxethyl-m-toluidine there may be substituted ethyl-m-toluidine, di-β-hydroxyethyl-m-toluidine, β-sulfoethyl-m-toluidine, butyl phosphatoethyl-m-toluidine, ethyl-β-hydroxyethyl aniline, di-β-hydroxyethylaniline, β-hydroxyethyl glyceryl aniline, ethyl-β-sulfatoethylaniline, β-methoxyethyl cyclohexylaniline, di-β-acetoxyethyl aniline, β-hydroxyethyl cresidine, di-β-hydroxyethyl cresidine, dimethylaniline, diphenylamine, and 1-β-hydroxyethylamino-5-naphthol.

Example 4

20.3 grams of 5-nitro-8-amino-2-methyl quinoline are diazotized and coupled with 15.9 grams of 1-amino-5-naphthol following the procedure described in Example 3. Cellulose acetate is colored blue shades from aqueous suspensions of the dye.

The azo compound prepared as above described has the formula:

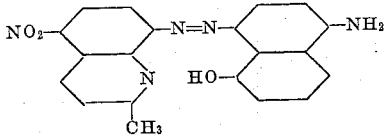

Example 5

22.3 grams of 5-nitro-7-chloro-8-aminoquinoline are diazotized and coupled with 16.7 grams of di-β-hydroxyethylaniline, following the procedure described in Example 3. Cellulose acetate is colored rubine shades from aqueous suspensions of the dye.

The azo compound thus obtained has the formula:

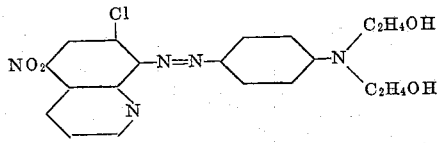

In place of 5-nitro-7-chloro-8-aminoquinoline there may be used 5-nitro-7-halo (F, Br, I)-8-aminoquinoline, 5-amino-6-nitro quinoline, 5-amino-6-nitro-8-halo (F, Cl, Br, I)-quinoline, 5-nitro-7-methoxy-8-aminoquinoline and similar type of compounds.

Example 6

(A) 23.2 grams of 5,7-dinitro-8-aminoquinoline are dissolved in 200 c.cs. of hot acetic acid and rapidly cooled to room temperature.

(B) 6.9 grams of sodium nitrite are added to 50 c.cs. of sulphuric acid at 15° C., heated to 70° C., and then cooled to 15° C.

Solution A is added to solution B over a period of 30 minutes, the mixture being stirred during the addition and during a further period of one hour thereafter. The diazo solution prepared as above is then added with stirring to an equivalent quantity of di-β-hydroxyethyl-α-naphthylamine dissolved in a well iced hydrochloric acid solution. The coupling reaction is completed by adding sufficient sodium acetate to neutralize the acid, after which the dye is filtered off, washed and dried. Cellulose acetate is colored purplish-blue shades from aqueous suspensions of the dye.

The azo compound thus obtained has the formula:

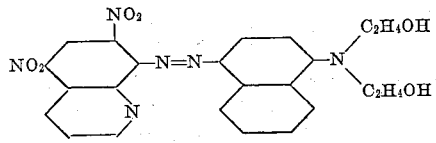

In place of di-β-hydroxyethyl-α-naphthalamine there may be substituted β-hydroxyethyl-α-naphthylamine, glyceryl-α-naphthylamine, 1-β-hydroxyethyl amino-5-naphthol, and the couplers mentioned in Example 3.

Example 7

18.9 grams of 6-nitro-5-aminoquinoline are placed in 200 c.cs. of water containing 50 c.cs. of hydrochloric acid and diazotized with 6.9 grams of sodium nitrite, at 5-15° C. An equivalent amount of thiobarbituric acid is dissolved in aqueous sodium carbonate, ice is added, and the diazo solution is added slowly. When the coupling reaction is complete, the mixture is made acid to litmus with acetic acid, and the dye is filtered off, washed and dried. Cellulose acetate is colored greenish-yellow shades from aqueous suspensions of the dye.

The azo compound thus obtained has the formula:

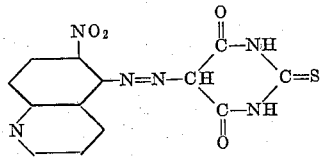

Example 8

18.9 grams of 5-nitro-8-aminoquinoline are diazotized and coupled with 10.7 grams of m-toluidine following the procedure described in Example 3. The resulting amino azo dye is then diazotized and coupled in the usual manner with one equivalent of a coupling component belonging to the benzene and naphthalene series, selected from the group of couplers mentioned in the preceding examples. If di-β-hydroxyethylaniline is used for the end component, the dye has the formula:

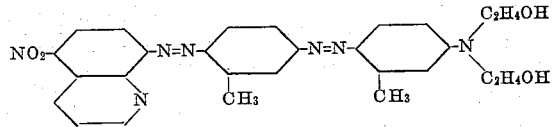

which colors cellulose acetate red shades from aqueous suspensions of the dye. In place of m-toluidine there may be substituted as middle components amines such as aniline, cresidine, m-alkoxy anilines, 2,5-dialkyl or alkoxyanilines, m-phenylene diamine, m-amino dialkyl anilines, and 2-halo-5-alkoxy anilines.

Valuable dyestuffs may also be obtained by diazotizing and coupling the amino quinolines of the preceding examples with compounds containing one or more nuclear sulphonic acid groups. Such sulfonated coupling components include 1-amino-8-naphthol-4,6-disulfonic acid, 1-amino-8-naphthol-3,6-disulfonic acid, 1-amino-8-naphthol-4-sulfonic acid, 2-amino-5-naphthol-7-sulfonic acid, 2-amino-8-naphthol-6-sulfonic acid, 2-naphthol-3,6-disulfonic acid, 2-naphthol-6-sulfonic acid, 2-naphthol-8-sulfonic acid, 1-naphthol-5-sulfonic acid, β-hydroxynaphthoic acid, 2-naphthylamine-4,8-disulfonic acid, 2-naphthylamine-6,8-disulfonic acid, 1-naphthylamine-5-sulfonic acid, 1-naphthylamine-6-sulfonic acid, 1-naphthylamine-8-sulfonic acid, 2-naphthylamine-6-sulfonic acid, and naphthol A. S. couplers.

The azo compounds of our invention will ordinarily be applied to the material to be colored in the form of aqueous suspensions which can be prepared by grinding the dye to a paste in the presence of a sulfonated oil, soap, or other suitable dispersing agent and dispersing the resulting paste in water. The dispersion prepared as above is heated to a temperature approximating 45-55° C. and the textile material, for example, an organic derivative of cellulose such as cellulose acetate in the form of threads or fabric is immersed in the solution and the temperature gradually raised to 80-85° C., at which point it is maintained for several hours. Salt may be added to promote exhaustion of the dye bath during this operation. When the dyeing operation is complete, the cellulose acetate silk is removed, washed with water and dried.

Typical organic derivatives of cellulose includes the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

We claim:

1. The azo compounds having the general formula:

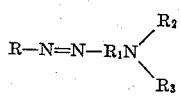

wherein R represents a quinoline nucleus attached to the azo group in position 5 or 8, $R_1$ represents a benzene coupling component nucleus containing group

in para position to the azo group, $R_2$ represents a member selected from the group consisting of hydrogen, an alkyl group, a hydroxyalkyl group, a cycloalkyl group, and a phenyl group, and $R_3$ represents a member selected from the group consisting of an alkyl group, a hydroxyalkyl group, a cycloalkyl group, and a phenyl group.

2. The azo compounds having the general formula:

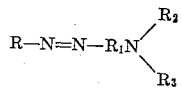

wherein R represents a quinoline nucleus attached to the azo group in position 5 or 8, $R_1$ represents a benzene coupling component nucleus containing the group

in para position to the azo group, $R_2$ represents a member selected from the group consisting of hydrogen, an alkyl group, a hydroxyalkyl group, a cycloalkyl group, and a phenyl group, and $R_3$ represents a hydroxyalkyl group.

3. The azo compounds having the general formula:

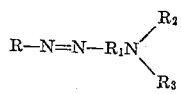

wherein R represents a quinoline nucleus attached to the azo group in position 5 or 8, $R_1$ represents a benzene coupling component nucleus containing the group

in para position to the azo group, $R_2$ represents hydrogen, and $R_3$ represents a hydroxyalkyl group.

4. The azo compounds having the general formula:

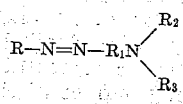

wherein R represents a quinoline nucleus attached to the azo group in position 5 or 8, $R_1$ represents a benzene coupling component nucleus containing the group

in para position to the azo group, $R_2$ represents an alkyl group, and $R_3$ represents a hydroxyalkyl group.

5. The azo compounds having the general formula:

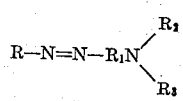

wherein R represents a quinoline nucleus attached to the azo group in position 5 or 8, $R_1$ represents a benzene coupling component nucleus containing the group

in para position to the azo group, $R_2$ and $R_3$ each represent a hydroxyalkyl group.

6. The azo compound having the formula:

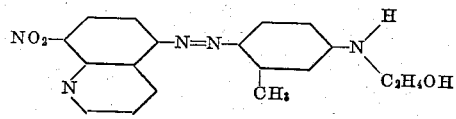

7. Material made of or containing an organic derivative of cellulose colored with a dye selected from the group of non-sulfonated nuclear azo compounds having the general formula:

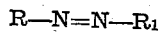

wherein R represents a quinoline nucleus attached to the azo group in position 5 or 8, and $R_1$ represents a benzene coupling component nucleus containing the group

in para position to the azo group, and wherein $R_2$ represents a member selected from the group consisting of hydrogen, an alkyl group, a hydroxyalkyl group, a cycloalkyl group, and a phenyl group, and $R_3$ represents a member selected from the group consisting of an alkyl group, a hydroxyalkyl group, a cycloalkyl group, and a phenyl group.

8. Material made of or containing cellulose acetate colored with a dye selected from the group of non-sulfonated nuclear azo compounds having the general formula:

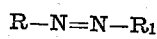

wherein R represents a quinoline nucleus attached to the azo group in position 5 or 8, and $R_1$ represents a benzene coupling component nucleus containing the group

in para position to the azo group, and wherein R₂ represents a member selected from the group consisting of hydrogen, an alkyl group, a hydroxyalkyl group, a cycloalkyl group, and a phenyl group, and R₃ represents a member selected from the group consisting of an alkyl group, a hydroxyalkyl group, a cycloalkyl group, and a phenyl group.

9. Material made of cellulose acetate colored with a dye selected from the group of non-sulfonated nuclear azo compounds having the general formula:

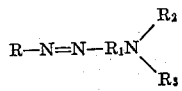

wherein R represents a quinoline nucleus attached to the azo group in position 5 or 8, R₁ represents a benzene coupling component nucleus containing the group

in para position to the azo group, R₂ represents a member selected from the group consisting of hydrogen, an alkyl group, a hydroxyalkyl group, a cycloalkyl group, and a phenyl group, and R₃ represents a hydroxyalkyl group.

JAMES G. McNALLY.
JOSEPH B. DICKEY.